United States Patent
Tanahashi et al.

(10) Patent No.: US 8,734,133 B2
(45) Date of Patent: May 27, 2014

(54) FUEL PUMP

(75) Inventors: Jyunki Tanahashi, Kariya (JP); Kiyoshi Nagata, Nagoya (JP)

(73) Assignee: Denso Corporation, Kariya (JP)

( * ) Notice: Subject to any disclaimer, the term of this patent is extended or adjusted under 35 U.S.C. 154(b) by 136 days.

(21) Appl. No.: 13/191,824

(22) Filed: Jul. 27, 2011

(65) Prior Publication Data

US 2012/0027629 A1 Feb. 2, 2012

(30) Foreign Application Priority Data

Aug. 2, 2010 (JP) ................................ 2010-173385

(51) Int. Cl.
*F04B 35/04* (2006.01)
(52) U.S. Cl.
USPC ............................................ 417/417; 310/71
(58) Field of Classification Search
USPC ...................... 417/410.1, 417, 423.1; 310/71
See application file for complete search history.

(56) References Cited

U.S. PATENT DOCUMENTS

| | | | |
|---|---|---|---|
| 7,205,689 B2 * | 4/2007 | Lukenich | ........................ 310/71 |
| 2005/0074343 A1 | 4/2005 | Naito | |
| 2010/0034674 A1 | 2/2010 | Oota et al. | |

FOREIGN PATENT DOCUMENTS

| | | |
|---|---|---|
| JP | 05-211738 | 8/1993 |
| JP | 2006-50808 | 2/2006 |
| JP | 2008-312276 | 12/2008 |
| JP | P2008-312277 A | 12/2008 |

OTHER PUBLICATIONS

Machine Translation of Tanizawa, JP 05-211738, published Aug. 20, 1993.*
Japanese Office Action dated Jun. 8, 2012, issued in corresponding Japanese Application No. 2010-173385 with English translation.
Office Action issued for Chinese Patent Application No. 201110224277.9, dated Jun. 25, 2013 (with English translation) 13 pages.
Notice of Official Rejection issued for Japanese Patent Application No. 2010-173853, dated Aug. 27, 2013 with partial English translation (4 pages).
Chinese Office Action issued for Chinese Patent Application No. 201110224277.9, dated Feb. 7, 2014 (with partial English translation).

* cited by examiner

*Primary Examiner* — Charles Freay
*Assistant Examiner* — Patrick Hamo
(74) *Attorney, Agent, or Firm* — Nixon & Vanderhye PC (57) ABSTRACT

A fuel pump has a motor portion and a pump portion, wherein fuel is sucked from an inlet port into the pump portion when an impeller is rotated and the pressurized fuel is discharged out of the fuel pump from an outlet port. A stator has multiple stator cores on which respective stator coils are wound to form a star-connection winding. A terminal sub-assembly is provided in an axial side portion of the stator. The terminal sub-assembly has multiple conductive members and each end portion of the stator coils is respectively connected to connecting portions of the conductive members, which are arranged at equal intervals in a circumferential direction of the terminal sub-assembly.

1 Claim, 8 Drawing Sheets

FUEL PUMP

CROSS REFERENCE TO RELATED APPLICATION

This application is based on Japanese Patent Application No. 2010-173385 filed on Aug. 2, 2010, the disclosure of which is incorporated herein by reference.

FIELD OF THE INVENTION

The present invention relates to a fuel pump for supplying fuel to, for example, fuel injection devices for an internal combustion engine.

BACKGROUND OF THE INVENTION

A fuel pump is conventionally known in the art, for example, as disclosed in Japanese Patent Publications No. 2005-110478, No. 2006-050808, and No. 2010-063344, according to which an impeller is rotated by a brushless motor to draw fuel from an inlet port and to pump out the fuel from an outlet port, so that the fuel is supplied to a device (for example, a fuel injection device for an internal combustion engine).

According to the above prior arts, stator coils for a stator of a brushless motor as well as terminals, to which wires are connected for supplying electric power to the stator coils, are disclosed. However, any one of those prior arts discloses neither wiring of end portions of the stator coils forming multiple phases nor electrical connection between the end portions of the stator coils. If each end portion of the stator coils is connected by manual procedures one by one, a manufacturing process for the electrical connection may become complicated and a number of manufacturing steps is increased.

SUMMARY OF THE INVENTION

The present invention is made in view of the above problems. It is an object of the present invention to provide a fuel pump, according to which wiring of end portions of stator coils as well as electrical connection between those end portions can be easily done, so that a number of manufacturing steps can be reduced.

According to a feature of the invention, for example, as defined in the claim 1, a fuel pump has a housing, a pump cover, an end cover, a cylindrical stator, a rotor, a shaft, an impeller, and a terminal sub-assembly.

The housing is formed in a cylindrical shape. The pump cover has an inlet port and closes one end of the housing. The end cover has an outlet port and closes the other end of the housing. The stator has multiple stator cores on which each stator coils corresponding to respective phase windings is wound. The stator is formed in a cylindrical shape, wherein the stator cores are arranged at an inner peripheral surface of the housing and in a circumferential direction of the housing. The rotor is rotatably accommodated in an inside of the stator in a radial direction thereof. The shaft is coaxially arranged with the rotor so that the shaft is rotated together with the rotor. The impeller is connected to the shaft and thereby rotated together with the shaft so as to draw fuel from the inlet port and to pump out pressurized fuel from the outlet port.

The terminal sub-assembly is provided in an axial side portion of the stator on a side of the end cover. The terminal sub-assembly has multiple conductive members to which each end portion of the stator coils on the side of the end cover is connected, and the multiple conductive members are integrally formed in the terminal sub-assembly. The terminal sub-assembly has terminals, to which wires are connected to supply electric power to the stator coils.

According to the present invention, the end portions of the multiple stator coils, which are located on the side of the end cover, are respectively connected to each other by the respective conductive members of the terminal sub-assembly. The conductive members are integrally molded to form a part of the terminal sub-assembly. In other words, the multiple end portions of the stator coils on the side of the end cover are respectively connected to each other by one terminal sub-assembly. According to such a structure, a process for wiring and connecting the multiple end portions of the stator coils can be easily carried out, when the fuel pump is manufactured.

In addition, it becomes possible to connect the terminal sub-assembly to the respective end portions of the stator coils by an automated machine, for example, a robot for a welding process, depending on the shape of the terminal sub-assembly or the locations of connecting points between the terminal sub-assembly and the end portions of the stator coils.

Furthermore, according to the invention, the terminal sub-assembly has the terminals, to which the multiple wires for supplying the electric power to the stator coils are connected. When compared with a case in which each of the terminals for power supply is connected to each of the end portions of the stator coils one by one, a number of working steps of the present invention can be decreased. In addition, since the terminal sub-assembly and the terminals are integrally formed, a number of parts and components can be reduced.

According to another feature of the invention, for example, as defined in the claim 7, a fuel pump has a housing, a pump cover, an end cover, a cylindrical stator, a rotor, a shaft, an impeller, and a neutral-point sub-assembly.

The housing is formed in a cylindrical shape. The pump cover has an inlet port and closes one end of the housing. The end cover has an outlet port and closes the other end of the housing. The stator has multiple stator cores on which each stator coils corresponding to respective phase windings is wound. The stator is formed in a cylindrical shape, wherein the stator cores are arranged at an inner peripheral surface of the housing and in a circumferential direction of the housing. The rotor is rotatably accommodated in an inside of the stator in a radial direction thereof. The shaft is coaxially arranged with the rotor so that the shaft is rotated together with the rotor. The impeller is connected to the shaft and thereby rotated together with the shaft so as to draw fuel from the inlet port and to pump out pressurized fuel from the outlet port.

The neutral-point sub-assembly, to which each end portion of the stator coils on a side of the pump cover is connected to form a neutral point for the respective phase windings, and the neutral-point sub-assembly is provided in an axial side portion of the stator on the side of the pump cover.

As above, the end portions of the multiple stator coils (on the side to the pump cover) are connected to each other by one neutral-point sub-assembly. According to such a structure, a process for wiring and connecting the multiple end portions of the stator coils can be easily carried out, when the fuel pump is manufactured.

In addition, it becomes possible to connect the neutral-point sub-assembly to the respective end portions of the stator coils by an automated machine, for example, a robot for a welding process, depending on the shape of the neutral-point sub-assembly or the locations of connecting points between the neutral-point sub-assembly and the end portions of the stator coils.

BRIEF DESCRIPTION OF THE DRAWINGS

The above and other objects, features and advantages of the present invention will become more apparent from the following detailed description made with reference to the accompanying drawings. In the drawings:

FIGS. 3A to 3C show a terminal sub-assembly for the fuel pump according to the embodiment of the present invention, wherein

FIGS. 4A to 4D show the terminal sub-assembly molded with resin for the fuel pump according to the embodiment of the present invention, wherein

FIGS. 5A to 5C show a neutral-point sub-assembly for the fuel pump according to the embodiment of the present invention, wherein

DETAILED DESCRIPTION OF THE PREFERRED EMBODIMENTS

The present invention will be explained by way of embodiments with reference to the drawings. A fuel pump 1 according to an embodiment of the present invention is shown in FIG. 1 to FIG. 3C.

Figure 1:
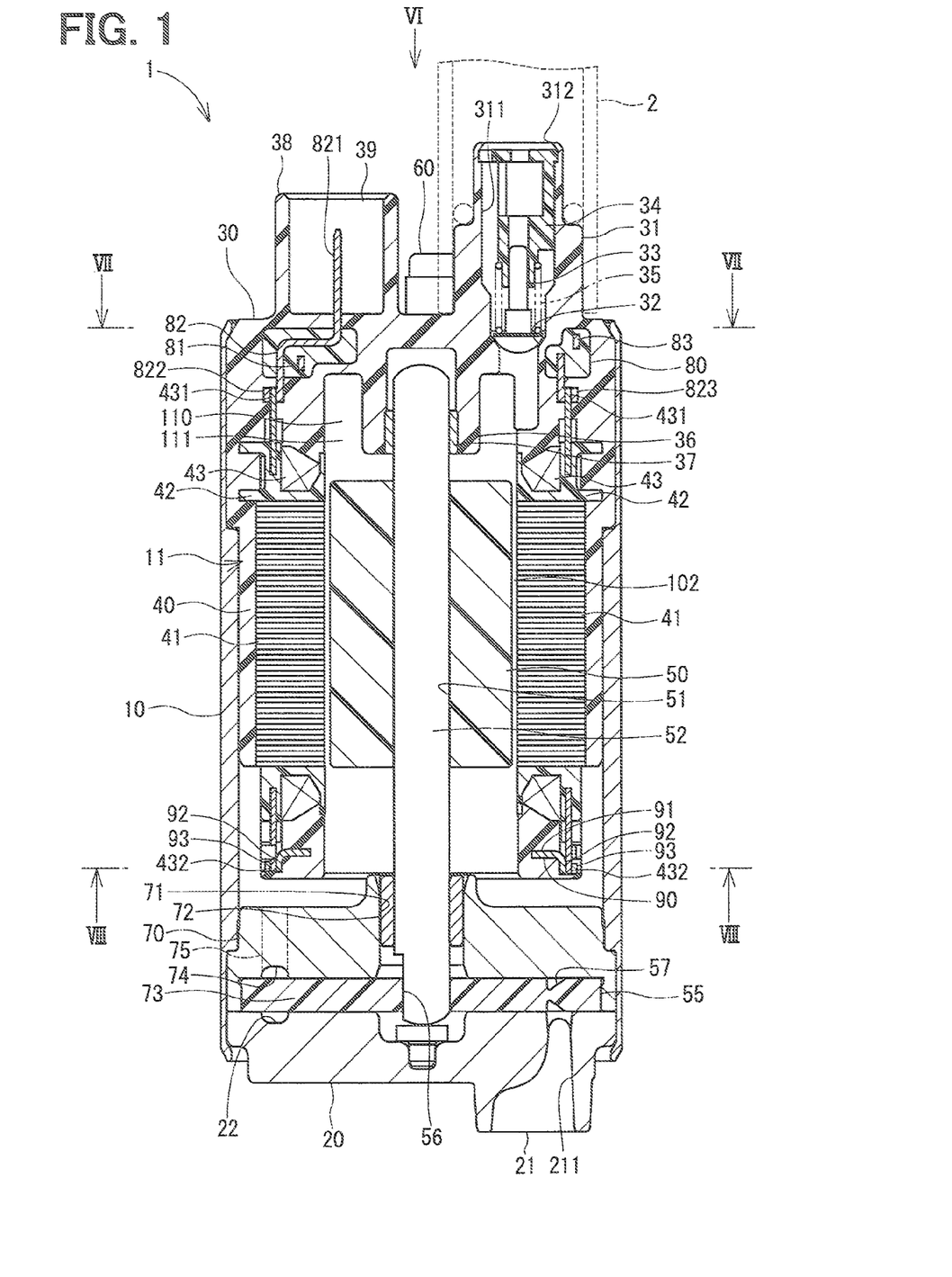
FIG. 1 is a schematic cross sectional view, taken along a line I-I in FIG. 6, showing a fuel pump according to an embodiment of the present invention.
Figure 2:
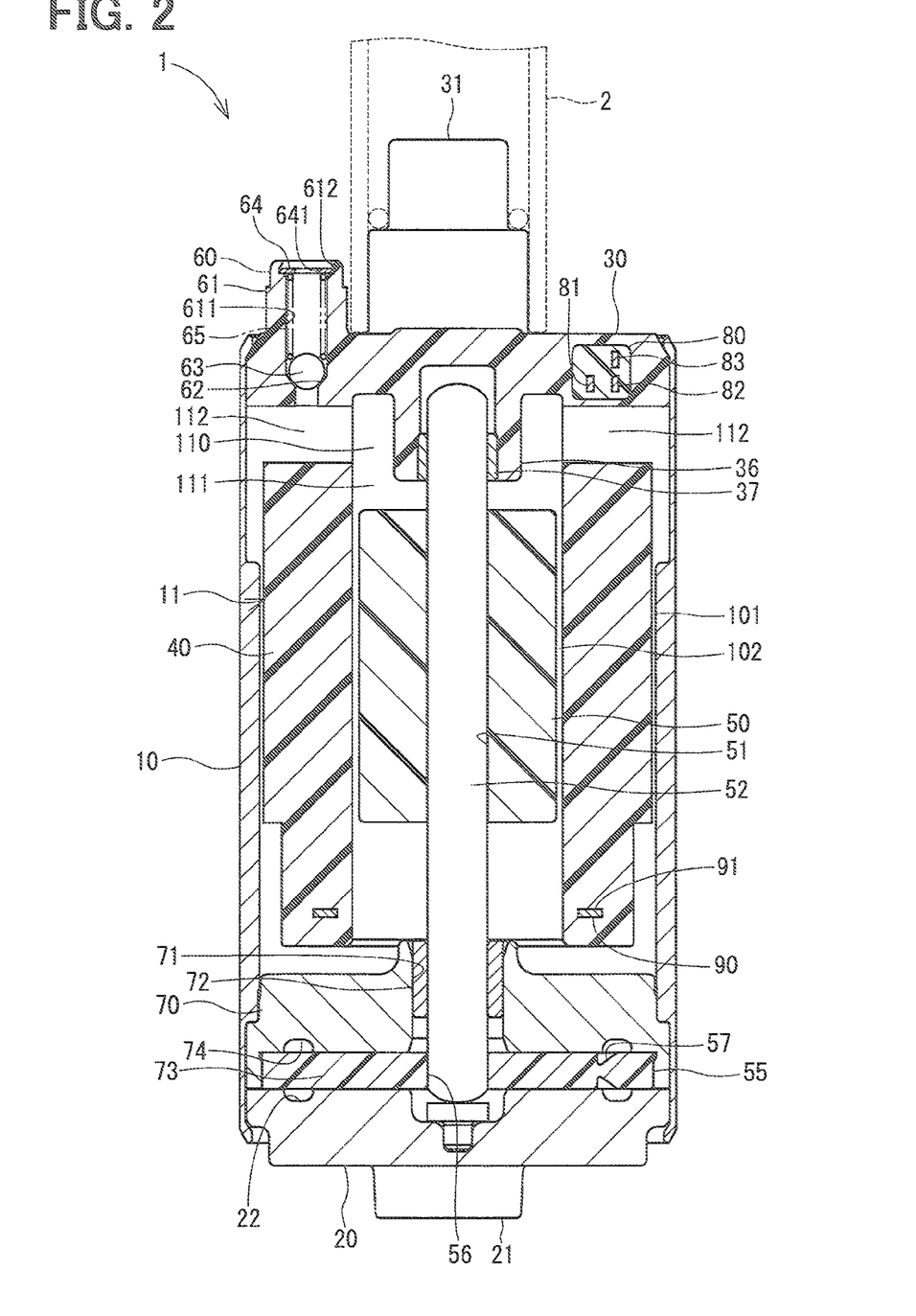
FIG. 2 is a schematic cross sectional view, taken along a line II-II in FIG. 6, showing the fuel pump according to the embodiment of the present invention.

The fuel pump 1 draws fuel in a fuel tank (not shown) and supplies the fuel to an internal combustion engine. As shown in FIGS. 1 and 2, the fuel pump 1 has a housing 10, a pump cover 20, an end cover 30, a stator 40, a rotor 50, a shaft 52, an impeller 55, a pressure relief valve 60, a terminal sub-assembly 80, a neutral-point sub-assembly 90 and so on.

The housing 10 is made of metal, for example, iron, and is formed in a cylindrical shape. Plating, such as zinc plating, tin plating and so on, is treated on a surface of the housing 10.

The pump cover 20 is made of metal, for example, aluminum, and formed in a disc shape. The pump cover 20 closes one end (a lower end in FIG. 1) of the housing 10. A lower end portion of the housing 10 is inwardly bent in a radial direction, so that the pump cover 20 is axially fixed to the lower end of the housing 10 at an inner side thereof. As shown in FIG. 1, a cylindrical inlet port 21 is formed in the pump cover 20 and an inlet passage 211 is formed in the inlet port 21 extending in a thickness direction of the pump cover 20.

The end cover 30 is made of, for example, resin and formed in a disc shape for closing the other end (an upper end) of the housing 10. An upper end portion of the housing 10 is inwardly bent in a radial direction, so that the end cover 30 is axially fixed to the upper end of the housing 10 at an inner side thereof. As shown in FIG. 1, a cylindrical outlet port 31 is formed in the end cover 30. The outlet port 31 extends from the end cover 30 in a direction opposite to the pump cover 20 (in an upward direction in the drawing). An outlet passage 311 is formed in the outlet port 31 extending in a thickness direction of the end cover 30. An open end 312 is formed at an upper end of the outlet port 31. A connecting member 2 (indicated by a dotted line in FIGS. 1 and 2) is attached to the outlet port 31, so that the fuel pump 1 is connected to the engine.

An annular valve seat 32 is formed at an intermediate portion of the outlet passage 311. A rod-like valve member 33 and a supporting member 34 are provided in the outlet passage 311. The supporting member 34 is fixed to a side of the open end 312 in the outlet passage 311 for movably supporting one end of the valve member 33 in a reciprocating direction. Therefore, the valve member 33 is reciprocal in the outlet passage 311 in an axial direction thereof. The other end of the valve member 33 is formed in a semi spherical shape and brought into contact with or separated from the valve seat 32. A spring 35 is provided between the valve member 33 and the supporting member 34 so as to bias the valve member 33 toward the valve seat 32.

The stator 40 has multiple stator cores 41, insulators 42, stator coils 43 and so on. The stator core 41 is composed of multiple built-up iron plates, in which multiple thin plates made of magnetic material are laminated in an axial direction. A part of the insulator 42 is formed in a cylindrical shape covering an outer peripheral surface of the stator core 41. The stator coils 43 are wound on the insulators 42. The stator cores 41, the insulators 42 and the stator coils 43 form multiple sets arranged in the housing 10 in a circumferential direction thereof. According to the present embodiment, six sets of the stator core 41, the insulator 42 and the stator coil 43 are provided in the circumferential direction of the housing 10.

As shown in FIGS. 1 and 2, the stator 40 (being composed of the stator cores 41, the insulators 42 and the stator coils 43) is integrally molded in the resin, which forms the end cover 30. In other words, the stator 40 is integrally molded with the end cover 30.

The stator 40, which is formed by molding the stator cores 41, the insulators 42 and the stator coils 43, is formed in a cylindrical shape. The stator 40 is coaxially accommodated in the housing 10. The stator cores 41 are covered with the resin or the insulators 42, except for the surfaces opposing to a center axis of the stator 40.

The rotor 50 is made of magnetic material (such as, a bond magnet) and formed in a cylindrical shape. The rotor 50 is provided inside of the stator 40 in the radial direction thereof. The rotor 50 is magnetized with multiple N-poles and S-poles, which are alternately arranged in the circumferential direction thereof. The shaft 52, which is made of metal and formed in a rod shape, is inserted into a center hole 51 of the rotor 50 and press-fitted thereto. The shaft 52 is thereby rotated together with the rotor 50.

A pump casing 70 is provided between the pump cover 20 and the stator 40. The pump casing is made of metal, such as aluminum, and formed in a disc shape. A through-hole 71 is formed in the pump casing 70 at a center thereof, wherein the through-hole 71 extends in a thickness direction of the pump casing 70. A bearing 72 is inserted into and press-fitted to the through-hole 71. The bearing 72 is made of sintered cupper-based metal and formed in a cylindrical shape.

A cylindrical projecting portion 36, projecting toward an axial side of the rotor 50, is formed at a center of the end cover 30. A bearing 37 is inserted into an inside of the projecting portion 36. The bearing 37 is also made of sintered cupper-based metal and formed in a cylindrical shape, like the bearing 72.

The bearings 72 and 37 are arranged at both sides of the rotor 50 for rotatably supporting the shaft 52. As a result, the rotor 50 as well as the shaft 52 is rotatably supported by the pump casing 70 and the end cover 30.

The impeller 55 is made of resin and formed in a disc shape. The impeller 55 is accommodated in a pump chamber 73 of a disc shape, which is formed between the pump cover 20 and the pump casing 70. One end (a lower end) of the shaft 52 is arranged in the pump chamber 73 and an outer peripheral edge thereof is cut off. A through-hole 56 is formed in the impeller 55 at a center thereof in such a shape corresponding to a cross sectional shape of the lower end of the shaft 52. The lower end of the shaft 52 is inserted through the through-hole 56 of the impeller 55. According to such a structure, when the shaft 52 is rotated, the impeller 55 is correspondingly rotated in the pump chamber 73.

A C-shaped groove 22 is formed on a surface of the pump cover 20 on a side of the impeller 55. The C-shaped groove 22 is communicated with the inlet passage 211. In a similar manner, a C-shaped grove 74 is formed on a surface of the pump casing 70 on the side of the impeller 55. A pump-out passage 75, which extends in a thickness direction of the pump casing 70, is formed in the pump casing 70. The C-shaped groove 74 is communicated to the pump-out passage 75. Blade portions 57 are formed on both sides of the impeller 55 at such portions respectively facing to the C-shaped grooves 22 and 74.

The pressure relief valve 60 is provided in the end cover 30. As shown in FIG. 2, the pressure relief valve 60 has a cylindrical portion 61, a fuel passage 611, a ball-shaped valve member 63, a plate member 64, a spring 65 and so on. The cylindrical portion 61 projects from the end cover 30 in the same direction to the outlet port 31. The fuel passage 611 is formed in the cylindrical portion 61 extending in the thickness direction of the end cover 30. An open end 612 is formed at one end (an upper end of the drawing) of the cylindrical portion 61. An annular valve seat 62 is formed at an intermediate portion of the fuel passage 611. The ball-shaped valve member 63 is made of, for example, metal and formed in a ball shape. The ball-shaped valve member 63 is movably arranged in the fuel passage 611 and brought into or separated from the valve seat 62. The plate member 64 is formed in a disc shape and fixed to the open end 612 of the fuel passage 611. The plate member 64 has an aperture 641 at a center thereof. The spring 65 is arranged between the ball-shaped valve member 63 and the plate member 64, so as to bias the ball-shaped valve member to the valve seat 62.

Figure 3A:
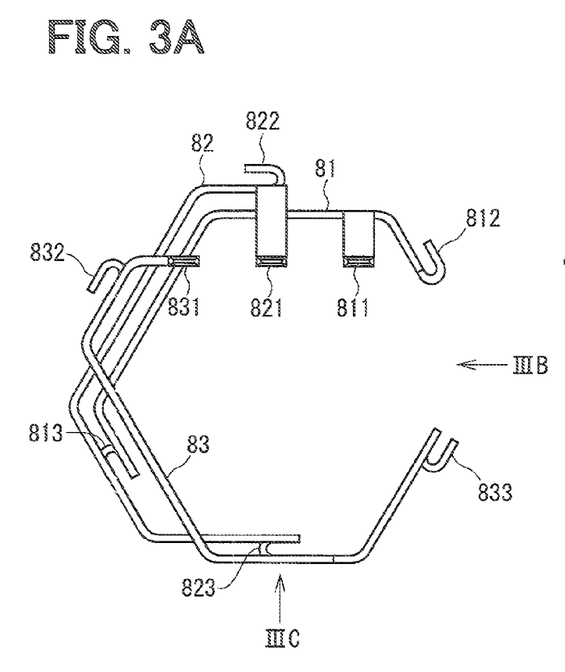
FIG. 3A is a plane view thereof.
Figure 3B:
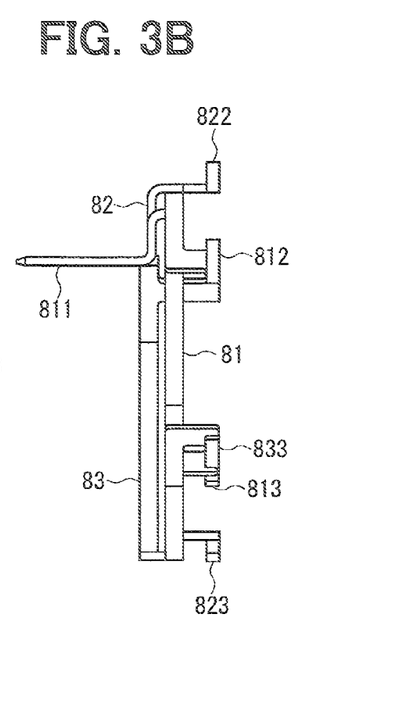
FIG. 3B is a view when viewed in a direction of an arrow IIIB in FIG. 3A.
Figure 3C:
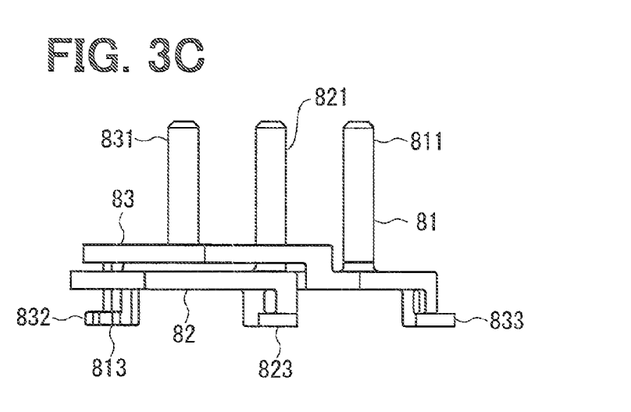
FIG. 3C is a view when viewed in a direction of an arrow IIIC in FIG. 3A.

As shown in FIGS. 1 and 2, the terminal sub-assembly 80 is formed in the end cover 30 by an insert-molding process. The terminal sub-assembly 80 is, therefore, provided between an uppermost surface of the end cover 30 and the stator 40. The terminal sub-assembly 80 has multiple (three) conductive members 81, 82 and 83 made of metal. As shown in FIG. 3A, each of the conductive members 81, 82 and 83 is formed in an almost arc shape. As is also shown in FIGS. 3A to 3C, the arc-shaped conductive member 81 has a terminal 811 extending in a direction parallel to a center axis of the terminal sub-assembly 80. In a similar manner, each of the conductive members 82 and 83 has a terminal 821 and a terminal 831, respectively, each of which extends in the direction in parallel to the center axis.

The conductive member 81 has connecting portions 812 and 813 at both ends thereof. In the same manner, each of the conductive members 82 and 83 has connecting portions 822, 823 and 832, 833, respectively at both ends thereof. Each of the connecting portions 812, 813, 822, 823, 832 and 833 is formed by a clinching process.

As shown in FIGS. 4A to 4D, each of the conductive members 81, 82 and 83 is displaced in the circumferential direction by a predetermined angle from each other and those conductive members 81 to 83 are integrally molded with resin. As a result, the terminal sub-assembly 80 is formed in a C-letter shape as a whole when viewed in a direction VI in FIG. 1. A base portion of each terminal 811, 821 and 831 is molded with the resin, while each forward end thereof is unsheathed. The terminals 811, 821 and 831 are integrally molded in a condition that each of the terminals extends straightly.

Figure 4A:
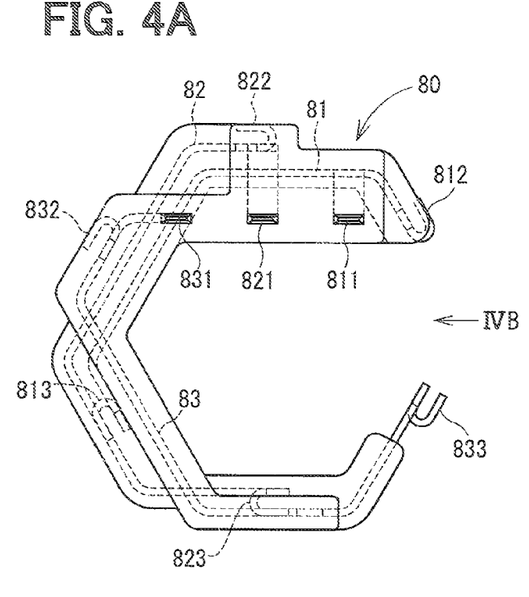
FIG. 4A is a plane view thereof.
Figure 4B:
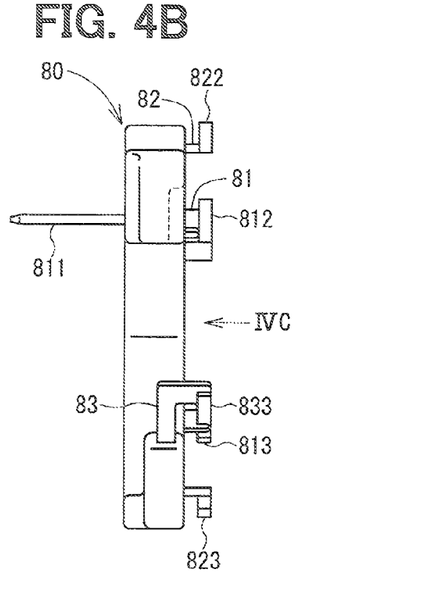
FIG. 4B is a view when viewed in a direction of an arrow IVB in FIG. 4A.
Figure 4C:
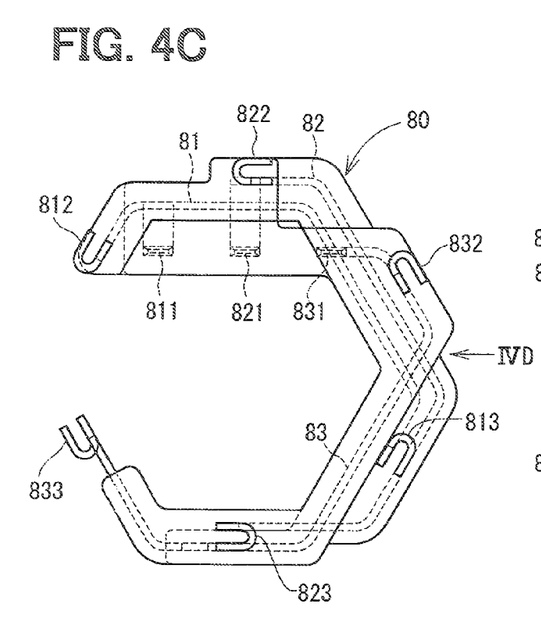
FIG. 4C is a view when viewed in a direction of an arrow IVC in FIG. 4B.
Figure 4D:
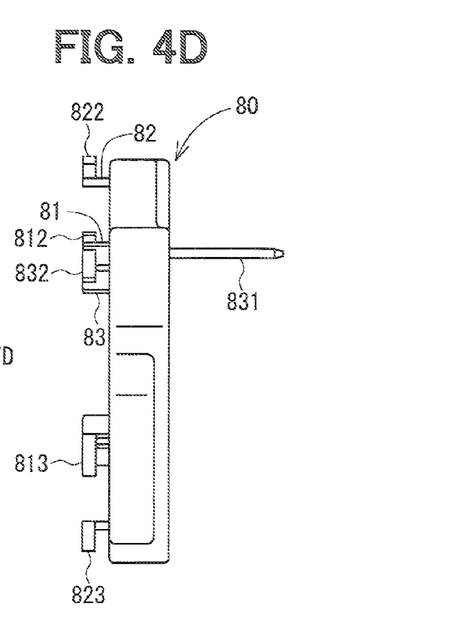
FIG. 4D is a view when viewed in a direction of an arrow IVD in FIG. 4C.

The connecting portions 812, 813, 822, 823, 832 and 833 are not molded with the resin but unsheathed like the forward ends of the terminals 811, 821 and 831. The connecting portions 812, 813, 822, 823, 832 and 833 are arranged in the circumferential direction of the terminal sub-assembly 80 at equal intervals, as shown in FIGS. 3A, 4A and 4C. In other wards, the connecting portions 812, 813, 822, 823, 832 and 833 are arranged in the circumferential direction of the terminal sub-assembly 80 at 60°, which corresponds to a value obtained by dividing 360° by six (that is, the number of the stator cores 41).

As shown in FIG. 1, the terminal sub-assembly 80 is insert-molded in the end cover 30. A (first) pair of the stator coils 43 are opposing to each other with respect to a center axis of the stator 40. Each end portion 431 of the stator coils 43, which is located on a side of the end cover 30, is connected to the respective connecting portions 822 and 823 of the conductive member 82, wherein the connecting portions 822 and 823 are symmetrically arranged about the center axis of the stator 40. In a similar manner, another (second) pair of the stator coils (43) are opposing to each other with respect to the center axis of the stator 40, and each end portion (431) (not shown) of the second pair of the stator coils (43) is connected to the respective connecting portions 812 and 813 of the conductive member 81. And a further (third) pair of the stator coils (43) are opposing to each other with respect to the center axis of the stator 40, and each end portion (431) (not shown) of the third pair of the stator coils (43) is connected to the respective connecting portions 832 and 833 of the conductive member 83. Each end portion 431 of the respective stator coils 43 is connected to the connecting portions 812, 813, 822, 823, 832 and 833, for example, by a welding process.

Each pair of the stator coils 43, which are opposing to each other with respect to the center axis of the stator 40, form a winding of the same phase. Namely, there are three pairs of the stator coils opposing to each other, wherein each of the pairs forms a U-phase winding, a V-phase winding and a W-phase winding. According to the present embodiment, the stator coils 43 forming the U-phase winding are connected to the conductive member 81, the stator coils 43 forming the V-phase winding are connected to the conductive member 82, and the stator coils 43 forming the W-phase winding are connected to the conductive member 83.

Figures 5A, 5B:
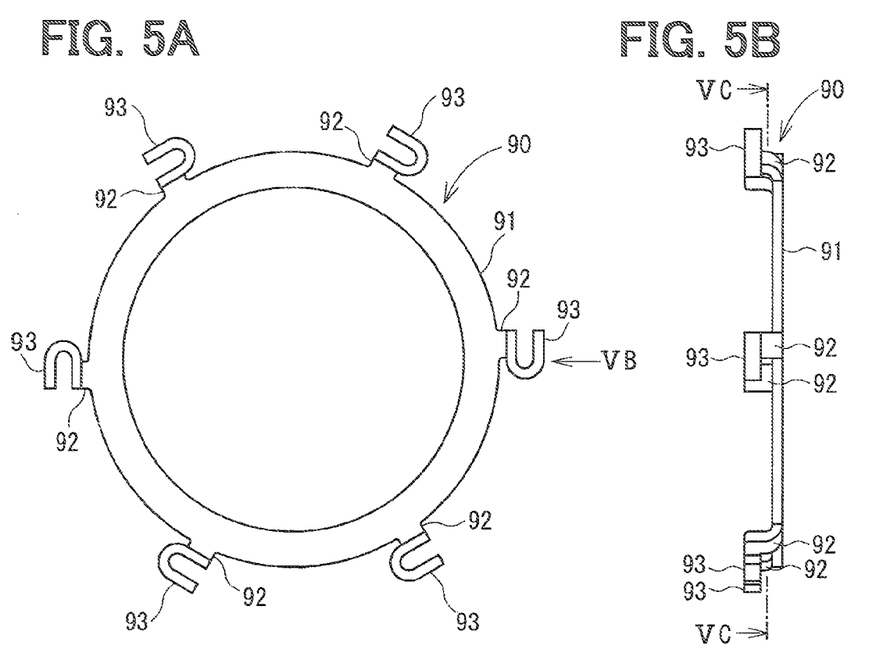
FIG. 5A is a plane view thereof.
FIG. 5B is a view when viewed in a direction of an arrow VB in FIG. 5A.
Figure 5C:
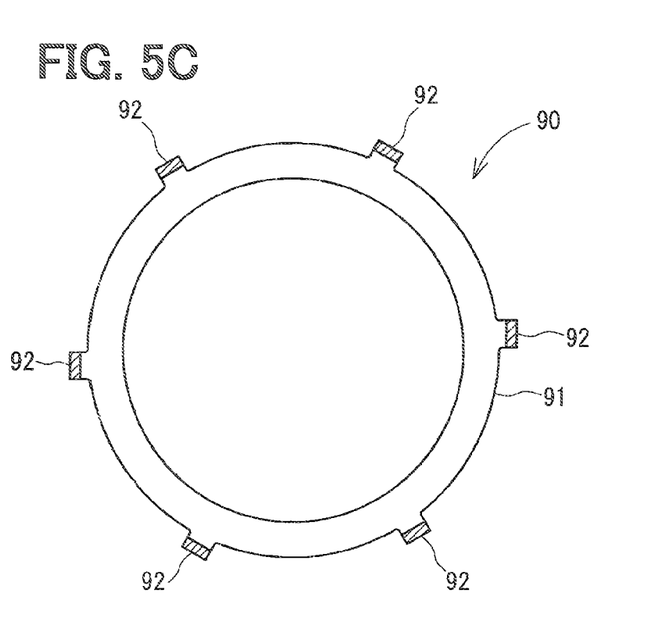
FIG. 5C is a cross sectional view taken along a line VC-VC in FIG. 5B.

As shown in FIGS. 1 and 2, the neutral-point sub-assembly 90 is provided between the stator 40 and the pump casing 70. The neutral-point sub-assembly 90 is made of a metal. As shown in FIG. 5A, the neutral-point sub-assembly 90 has a base portion 91, multiple (six) supporting portions 92 and multiple (six) connecting portions 93. The base portion 91 is formed in a circular shape. Each of the supporting portions 92 extends outwardly from an outer periphery of the base portion 91 and then bent in an axial direction of the fuel pump 1, as shown in FIG. 5B. The multiple (six) supporting portions 92 are arranged at the outer periphery of the base portion 91 at equal intervals in the circumferential direction thereof, as shown in FIGS. 5A and 5C. Namely, the supporting portions 92 are arranged at the intervals of 60°. Each of the connecting portions 93 is provided at the respective supporting portions 92. The connecting portions 93 are made by the clinching process in a similar manner to the terminal sub-assembly 80. Each of the connecting portions 93 is formed that a distance thereof in a radial direction from a center of the sub-assembly 90 is equal to those of the other connecting portions 93.

Figure 8:
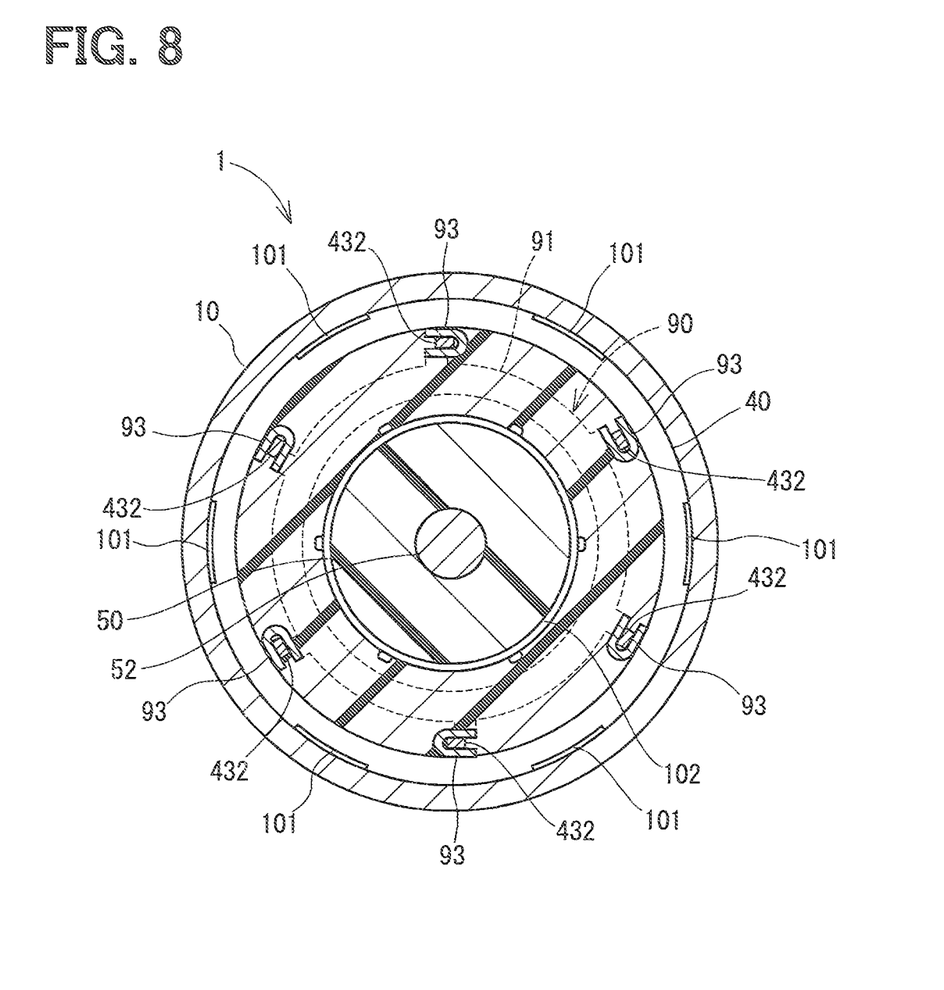
FIG. 8 is a cross sectional view taken along a line VIII-VIII in FIG. 1.

As shown in FIG. 1, the neutral-point sub-assembly 90 is integrally molded with resin together with the stator 40. All portions of the neutral-point sub-assembly 90 are covered by the resin. Each of lower ends 432 of the respective (six) stator coils 43 (the lower ends on a side of the pump cover 20) is connected to the respective connecting portions 93 of the neutral-point sub-assembly 90, as shown in FIGS. 1 and 8. The neutral-point sub-assembly 90 forms the neutral point of the respective phase windings (the U-phase winding, V-phase winding, W-phase winding). Each end portion 432 of the stator coils 43 is connected to the respective connecting portions 93, for example, by the welding process.

Figure 6:
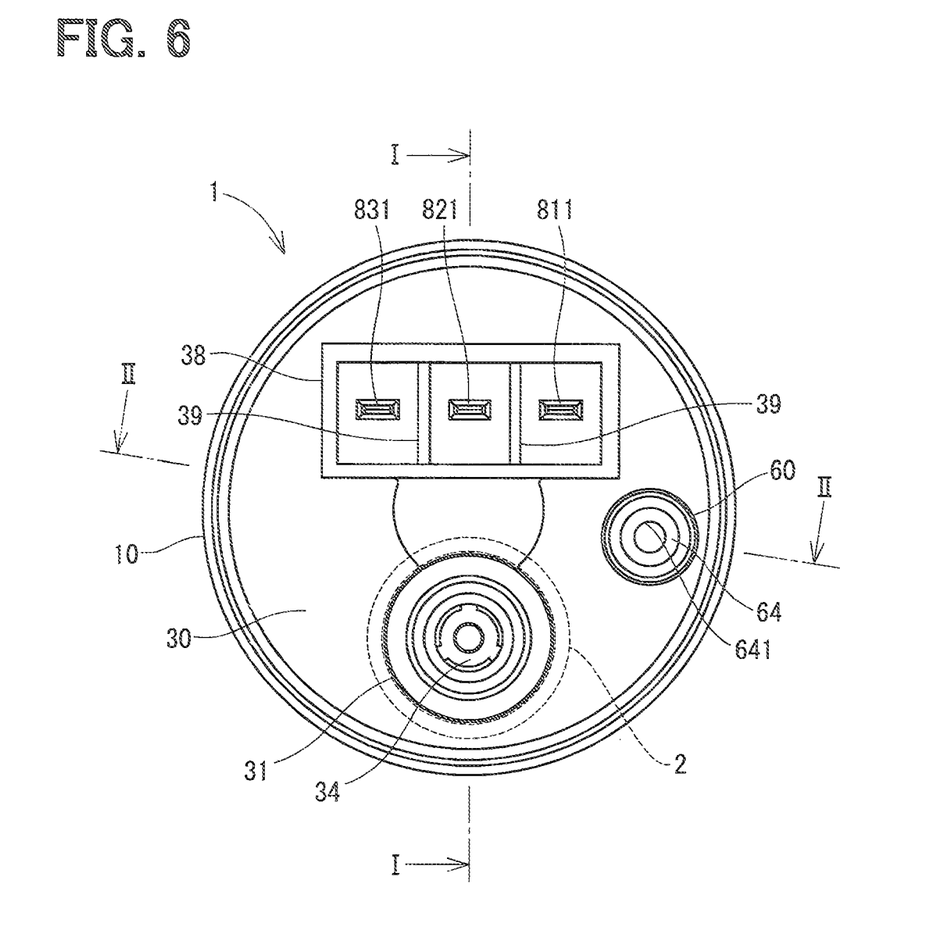
FIG. 6 is a plane view of the fuel pump when viewed in a direction VI in FIG. 1.

As shown in FIGS. 1 and 6, the terminal sub-assembly 80 is insert-molded in the end cover 30 in such a way that the terminals 811, 821 and 831 project from the end cover 30 in the same direction to the outlet port 31. A connector 38, surrounding the terminals 811, 821 and 831, is formed at the end cover 30. As shown in FIG. 6, the connector 38 is formed in a rectangular shape when viewed in the axial direction of the housing 10. Multiple partitioning walls 39 are formed in the connector 38 between the respective terminals 811, 821 and 831.

An end of a wire harness (not shown) is connected to the connector 38. Each wire of the wire harness is respectively connected to the terminals 811, 821 and 831. The other end (not shown) of the wire harness (on the opposite side of the connector 38) is connected to a control unit (not shown). The control unit controls power supply to the respective phase coils 43 via the wire harness and the terminals 811, 821 and 831. When the power supply to the respective phase coils 43 is controlled by the control unit, rotating magnetic field is generated at the stator 40 to thereby rotate the rotor 50 together with the shaft 52.

As above, the stator 40, the rotor 50 and the shaft 52 form an inner-rotor type electric motor portion 11. According to the present embodiment, the motor portion 11 is a three-phase brushless motor.

As shown in FIGS. 2 and 8, an outer-side fuel passage 101 extending in the axial direction of the fuel pump 1 is formed between the stator 40 molded with the resin and an inner peripheral wall of the housing 10. As shown in FIGS. 1 and 2, an inner-side fuel passage 102 of a cylindrical shape is formed between an inner peripheral surface of the stator 40 and an outer peripheral surface of the rotor 50.

As shown in FIG. 2, an interfluent fuel passage 110 is formed between the end cover 30 and the stator 40 in the axial direction and between the rotor 50 and the housing 10 in the radial direction, wherein the fuel passage 110 is communicated with the outer-side and inner-side fuel passages 101 and 102. The interfluent fuel passage 110 is composed of a first passage portion 111 formed in a cylindrical shape around the shaft 52 and the projecting portion 36 and a second passage portion 112 outwardly extending from the first passage portion 111 in the radial direction.

As shown in FIGS. 1 and 2, the first passage portion 111 is coaxially communicated to an upper end of the inner-side fuel passage 102. As shown in FIG. 2, the second passage portion 112 is communicated to a radial-outward end of the first passage portion 111 and to the outer-side fuel passage 101.

As above, the outer-side fuel passage 101, the inner-side fuel passage 102 and the interfluent fuel passage 110 are formed in an inside of the fuel pump 1, that is, a space surrounded by the housing 10, the pump cover 20 and the end cover 30.

Figure 7:
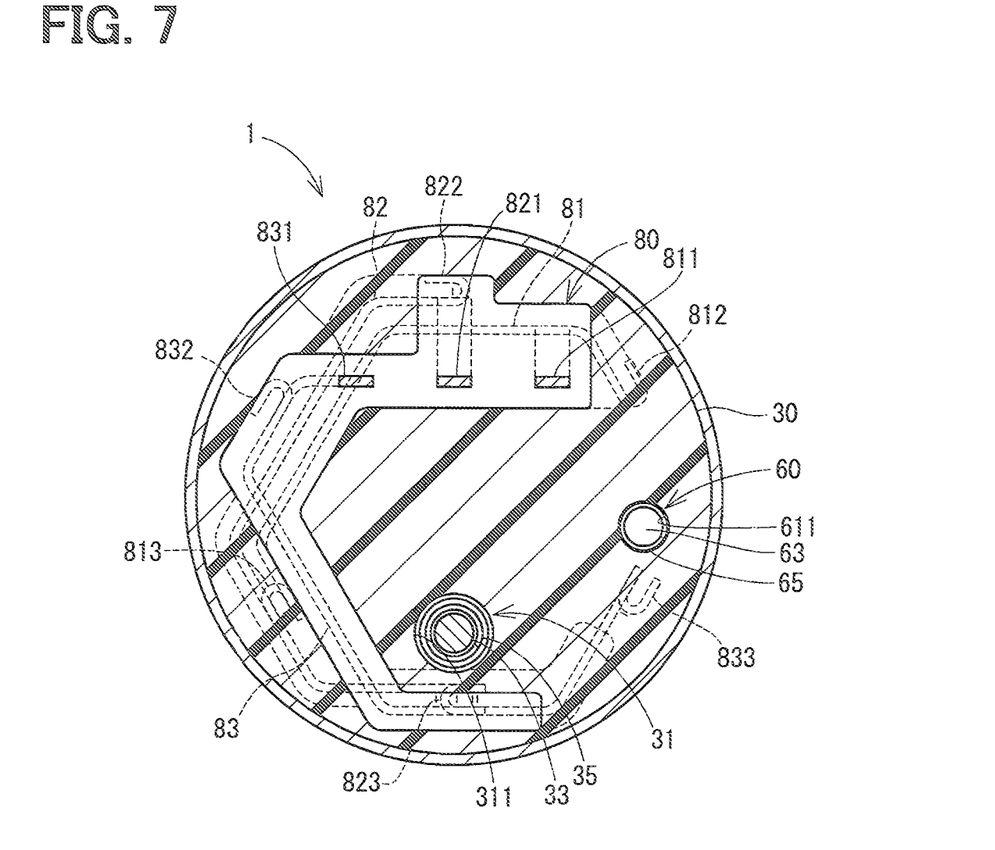
FIG. 7 is a cross sectional view taken along a line VII-VII in FIG. 1.

According to the present embodiment, the fuel passage 611 of the pressure relief valve 60 (the other end of the fuel passage 611 opposite to the open end 612) is communicated to the second passage portion 112 of the interfluent fuel passage 110. As shown in FIG. 7, the pressure relief valve 60 is provided at such a position, which is located at an open area of the C-letter shaped terminal sub-assembly 80.

As shown in FIG. 1, the outlet passage 311 of the outlet port 31 is communicated to an outer peripheral portion of the first passage portion 111. As shown in FIG. 7, the outlet port 31 is provided at such a position, which is located in an inner peripheral area of the C-letter shaped terminal sub-assembly 80.

An operation of the fuel pump 1 will be explained with reference to FIGS. 1 and 2.

When the electric power is supplied to the stator coils 43 of the motor portion 11, the impeller 55 is rotated together with the rotor 50 and the shaft 52. The fuel at the outside of the fuel pump 1 is sucked into the groove 22 through the inlet port 21. The fuel sucked into the groove 22 is pressurized in accordance with the rotation of the impeller 55 and introduced into the groove 74. The pressurized fuel flows through the pump-out passage 75 and supplied to a space on the side of the pump casing 70, which is opposite side of the impeller 55.

The fuel further flows through the outer-side and inner-side fuel passages 101 and 102 into the interfluent fuel passage 110. The fuel respectively flowing through the outer-side and inner-side fuel passages 101 and 102 flow into each other at the interfluent fuel passage 110.

When the impeller 55 is continuously rotated, the fuel pressure is thereby increased. When the fuel pressure in the interfluent fuel passage 110 reaches at a predetermined value, the valve member 33 provided in the outlet passage 311 is moved to a valve opened position. As a result, the fuel in the interfluent fuel passage 110 is discharged from the fuel pump via the outlet passage 311. The fuel discharged from the outlet port 31 is supplied to the engine (not shown) via the connecting member 2.

When the fuel pressure in the interfluent fuel passage 110 is further increased, and when the fuel pressure reaches at such a predetermined pressure lower than a pressure, which may damage the connecting member 2 or the fuel pump 1 (that is, a pressure generating an ultimate stress in the related parts), the pressure relief valve 60 (the ball-shaped valve member 63) is opened. Then, the fuel of the interfluent fuel passage 110 is discharged out of the fuel pump 1 via the fuel passage 611 of the pressure relief valve 60, the plate member 64 and the aperture 641. As a result, the fuel pressure in the interfluent fuel passage 110 is relieved. As above, according to the present embodiment, an upper limit of the fuel pressure to be discharged is maintained at a certain value by the pressure relief valve 60.

When the rotation of the impeller 55 is decreased or stopped, the fuel pressure in the interfluent fuel passage 110 will be decreased. When the fuel pressure in the interfluent fuel passage 110 becomes lower than that in the connecting member 2, the valve member 33 in the outlet passage 311 is moved to a valve closed position. Then, the supply of the fuel from the fuel pump 1 to the engine is stopped. When the valve member 33 is seated on the valve seat 32, back flow of the fuel from the connecting member 2 to the fuel pump 1 is prevented. Therefore, the valve member 33 functions as a check valve.

As above, when the impeller 55 is rotated by the motor portion 11, the fuel is sucked into the fuel pump 1 via the inlet port 21 and then the pressurized fuel is discharged from the outlet port 31. A biasing force of the spring 35 for biasing the valve member 33 is smaller than that of the spring 65 for biasing the valve member 63. The biasing force of the spring 65 is designed based on the ultimate stress generated in the connecting member 2 or the fuel pump 1, so that the connecting member 2 and the fuel pump 1 may not be damaged by the fuel pressure.

According to the above explained embodiment, the end portions 431 of the multiple stator coils 43, which are located on the side of the end cover 30, are respectively connected to each other by the respective conductive members 81, 82 and 83 of the terminal sub-assembly 80. The conductive members 81, 82 and 83 are integrally molded to form a part of the terminal sub-assembly 80. In other words, the multiple end portions 431 of the stator coils 43 on the side of the end cover 30 are respectively connected to each other by one terminal sub-assembly 80. According to such a structure, a process for wiring and connecting the multiple end portions 431 of the stator coils 43 can be easily carried out, when the fuel pump 1 is manufactured.

According to the above embodiment, the terminal sub-assembly 80 has the terminals 811, 821 and 831, to which the multiple wires for supplying the electric power to the stator coils 43 are connected. When compared with a case in which each of the terminals for power supply is connected to each of the end portions 431 of the stator coils 43 one by one, a number of working steps of the present invention can be decreased. In addition, since the terminal sub-assembly 80 and the terminals 811, 821 and 831 are integrally formed, a number of parts and components can be reduced.

According to the above embodiment, the fuel pump 1 has the pressure relief valve 60 provided in the end cover 30, which is opened when the fuel pressure in the space surrounded by the housing 10, the pump cover 20 and the end cover 30 (including the outer-side fuel passage 101, the inner-side fuel passage 102 and the interfluent fuel passage 110) exceeds the predetermined value. Accordingly, the pressure of the fuel to be discharged from the outlet port 31 (that is, the upper limit value) can be maintained at a constant value.

According to the above embodiment, the terminal sub-assembly 80 is formed in the C-letter shape. The pressure relief valve 60 is provided at the position, which is located in the open area of the C-letter shaped terminal sub-assembly 80. The outlet port 31 is provided at the position, which is located in the inner peripheral area of the C-letter shaped terminal sub-assembly 80. As above, since the terminal sub-assembly 80 is formed in the C-letter shape, it is easier to keep the positions for the pressure relief valve 60 and the outlet port 31, in each of which the inside and the outside of the fuel pump 1 are operatively communicated with each other.

Furthermore, according to the above embodiment, the end portions 431 of the multiple stator coils 43 (on the side of the end cover 30) are arranged at the intervals 60° (corresponding to the angle by dividing 360° by the number (six) of the stator cores 41) in the circumferential direction of the terminal sub-assembly 80 and connected to the respective conductive members of the terminal sub-assembly 80. Namely, the end portions 431 of the stator coils 43 are arranged at the equal intervals in the circumferential direction of the terminal sub-assembly 80. It is, therefore, easier to automate the manufacturing process for welding the end portions 431 of the stator coils 43 to the terminal sub-assembly 80. For example, it is possible to carry out the welding process between the end portions 431 of the stator coils 43 and the terminal sub-assembly 80, when the terminal sub-assembly 80 or a welding device is rotated in the circumferential direction of the terminal sub-assembly 80 in accordance with an automated program. Since the end portions 431 of the stator coils 43 are arranged at the equal intervals in the circumferential direction of the terminal sub-assembly 80, it is easier to locate the terminal sub-assembly 80 in the welding process.

According to the above embodiment, the fuel pump has the circular neutral-point sub-assembly 90, which forms the neutral point (for the U-phase winding, the V-phase winding and W-phase winding) when the end portions 432 of the multiple stator coils 43 (on the side of the pump cover 20) are connected to the sub-assembly 90. According to the above embodiment, therefore, the three phase windings are connected in a star-connection form. The neutral-point sub-assembly 90 is assembled to the side portion of the stator 40 on the side to the pump cover 20. In other words, the neutral-point sub-assembly 90 is formed in the stator 40 on the opposite side to the terminal sub-assembly 80.

As above, the end portions 432 of the multiple stator coils 43 (on the side to the pump cover 20) are connected to each other by one neutral-point sub-assembly 90. According to such a structure, a process for wiring and connecting the multiple end portions 432 of the stator coils 43 can be easily carried out, when the fuel pump 1 is manufactured.

According to the above embodiment, the end portions 432 of the multiple stator coils 43 (on the side of the pump cover 20) are arranged at the intervals 60° (corresponding to the angle by dividing 360° by the number (six) of the stator cores 41) in the circumferential direction of the neutral-point sub-assembly 90 and connected thereto. Namely, the end portions 432 of the stator coils 43 are arranged at the equal intervals in the circumferential direction of the neutral-point sub-assembly 90. It is, therefore, easier to automate the manufacturing process for welding the end portions 432 of the stator coils 43 to the neutral-point sub-assembly 90. For example, it is possible to carry out the welding process between the end portions 432 of the stator coils 43 and the neutral-point sub-assembly 90, when the neutral-point sub-assembly 90 or a welding device is rotated in the circumferential direction of the neutral-point sub-assembly 90 in accordance with an automated program. Since the end portions 432 of the stator coils 43 are arranged at the equal intervals in the circumferential direction of the neutral-point sub-assembly 90, it is easier to locate the neutral-point sub-assembly 90 in the welding process.

According to the above embodiment, since the neutral-point sub-assembly 90 is formed in the circular shape and provided in the side portion of the stator 40 on the side of the pump cover 20, the shaft 52 can be inserted through the neutral-point sub-assembly 90. As a result, it is possible to effectively locate the multiple parts and components in a limited space of the fuel pump 1.

(Modifications)

According to one of modifications of the present invention, the pressure relief valve may be removed from the fuel pump.

According to another modification, the end portions of the multiple stator coils on the side of the end cover may be arranged at not equal but uneven intervals in the circumferential direction of the terminal sub-assembly. Furthermore, in the same manner, the end portions of the multiple stator coils on the side of the pump cover may be arranged at not equal but uneven intervals in the circumferential direction of the neutral-point sub-assembly. The neutral-point sub-assembly may not be always formed in the circular shape but may be formed in a rectangular shape, a C-letter shape or any other shape.

According to a further modification, the terminal sub-assembly of the above embodiment is used on one hand, while the neutral-point sub-assembly may be eliminated on the other hand. Instead, the end portions of the multiple stator coils on the side to the pump cover 20 may be directly connected to one another.

According to a further modification, the neutral-point sub-assembly of the above embodiment is used on one hand, but on the other hand, the end portions of the multiple stator coils on the side of the end cover may be respectively connected to each other.

According to a still further modification of the invention, the pump casing 20 and the end cover 30 (the projecting portion 36 thereof) may directly and rotatably support the shaft 52 without providing the bearings 72 and 37.

According to a still further modification, the end cover may be formed as a separate member from the stator.

According to a still further modification, the whole portion of the rotor may not be formed by the bond magnet, but the bond magnet or ferrite magnet may be attached to an outer periphery of the cylindrical rotor.

According to a still further modification, the motor portion, which is composed of the stator, the rotor and the shaft, may not be always the three-phase driving type but may be any other phase driving type.

According to a still further modification, the outlet port, the pressure relief valve and the connector may be formed on the outer surface of the end cover in any other positions than those explained above. The connector may not be formed in the end cover.

The device or apparatus, to which the fuel is supplied from the fuel pump of the invention, may not be limited to the internal combustion engine, but may be any device which requires the fuel supply.

The pump of the present invention may not be limited to the fuel pump but may be used for other fluid (liquid and gas) to be sucked and pumped out.

The present invention should not be limited to the above embodiment and/or modifications but may be further modified in various ways without departing the sprit of the invention.

What is claimed is:

1. A fuel pump comprising:
a cylindrical housing;
a pump cover for closing one end of the housing and having an inlet port;
an end cover for closing the other end of the housing and having an outlet port;
a cylindrical stator having multiple stator cores, on which each of stator coils corresponding to respective phase windings is wound, the multiple stator cores being arranged at an inner peripheral surface of the housing and in a circumferential direction of the housing,
a rotor rotatably accommodated in an inside of the stator in a radial direction thereof;
a shaft coaxially arranged with the rotor so that the shaft is rotated together with the rotor;
an impeller connected to the shaft and thereby rotated together with the shaft so as to draw fuel from the inlet port and to pump out pressurized fuel from the outlet port; and
a terminal sub-assembly provided in an axial side portion of the stator on a side of the end cover,
wherein the terminal sub-assembly has multiple conductive members to which each end portion of the stator coils on the side of the end cover is connected,
wherein the multiple conductive members are integrally formed in the terminal sub-assembly,
wherein the terminal sub-assembly has terminals, to which wires are connected to connected to supply electric power to the stator coils, and
wherein the multiple connecting portions are arranged in the circumferential direction of the stator at an angle, which is equal to a value calculated by dividing 360° by a number of the stator cores, and
each of the connecting portions is respectively connected to the respective end portions of the stator coils.

* * * * *